United States Patent [19]

Shen et al.

[11] 3,897,432

[45] July 29, 1975

[54] SUBSTITUTED BENZIMIDAZOLE DERIVATIVES

[75] Inventors: Tsung-Ying Shen, Westfield; Victor J. Grenda, Warren; Robert F. Czaja, Scotch Plains, all of N.J.

[73] Assignee: Merck & Co., Inc., Rahway, N.J.

[22] Filed: Aug. 31, 1973

[21] Appl. No.: 393,383

Related U.S. Application Data

[63] Continuation-in-part of Ser. No. 136,186, April 21, 1971, abandoned.

[52] U.S. Cl... 260/256.4 Q; 260/243 R; 260/244 R; 260/256.5 R; 260/304; 260/307 D; 260/309.2; 260/326.13; 260/471 C; 424/246; 424/248; 424/251; 424/273
[51] Int. Cl............................................. C07d 51/48
[58] Field of Search............................. 260/256.4 Q

[56] References Cited
UNITED STATES PATENTS 3,403,153  9/1968  Blatter et al.................. 260/256.4 Q
3,560,501  2/1971  Walker........................ 260/256.4 Q

FOREIGN PATENTS OR APPLICATIONS 2,006,206  10/1970  Germany

OTHER PUBLICATIONS

Chemical Abstracts, 52: 5388b, 69: 10397y, 73: 98946t, 74: 100046r, 75: 76790b, 75: 127047z.

*Primary Examiner*—Donald G. Daus
*Assistant Examiner*—David E. Wheeler
*Attorney, Agent, or Firm*—David L. Rose; J. Jerome Behan

[57] ABSTRACT

New compounds are provided being derivatives of benzimidazole. The benzimidazole compounds are substituted with benzo (heterocyclic)-ethyl compounds which may be optionally substituted on the benzoheterocyclic ring with alkoxy and the ethane group with hydroxy groups. Processes for their preparation from a carboxylic acid, a derivative thereof, an aldehyde, a derivative thereof or a nitrile and a benzenoid derivative possessing appropriately arranged amino, hydroxy mercapto, carboxy or carboxamido groups are also disclosed. The compounds are active antiviral agents and compositions for that use are also disclosed.

3 Claims, No Drawings

SUBSTITUTED BENZIMIDAZOLE DERIVATIVES

RELATIONSHIP TO OTHER APPLICATIONS

This application is a continuation in part of application Ser. No. 136,186 filed April 21, 1971, now abandoned.

SUMMARY OF THE INVENTION

This invention relates to benzimidazoles and derivatives thereof and to processes for their preparation. In particular, this invention relates to 2-ethyl benzimidazoles in which the ethyl group is substituted at the 2-position with a benzoxazolyl, benzothiazolyl, indolyl or a quinazolinonyl group, which may be optionally substituted. The benzimidazole derivatives thus produced have been shown to be active compounds for the treatment of viral infections.

The benzimidazoles and derivatives thereof of the instant invention are best represented by the following structural formula:

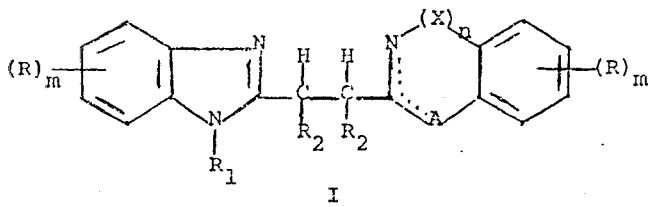

I wherein each R is loweralkoxy, cycloloweralkoxy, haloloweralkoxy, loweralkyl, loweralkylthio, halogen, and loweralkenyl; $R_1$ is hydrogen or loweralkyl; each $R_2$ is hydrogen or hydroxyl; X is a carbonyl group; A is an oxygen, sulfur, nitrogen or carbon; n is 0 or 1; m is 0, 1 or 2; and the dotted line indicates that the double bond may be located at either of the two positions available between A and N.

When in the instant application reference is made to "lower" as used in loweralkoxy or loweralkyl, what is meant is that the carbon chain contains from 1 to 5 carbon atoms which may be arranged linearly or in a branched configuration.

The loweralkoxy groups of the instant invention are represented by methoxy, ethoxy, propoxy, butoxy, amyloxy and branched isomers thereof, such as isopropoxy, sec-butoxy or isoamyloxy. The term loweralkyl is represented by methyl, ethyl, propyl, butyl, amyl or branched isomers thereof such as isopropyl, tert-butyl, or isoamyl.

The compounds of the instant invention are generally isolated as the mono- or di- acid addition salts, said salts being preferred because of their easier handling characteristics and greater tendency to dissolve in water, thus rendering the compounds more amenable to more varying forms of administration. The non-toxic acid addition salts of both the inorganic and organic varieties are preferred such as hydrohalides, represented by hydrochlorides, hydrobromides, and the like; sulfates, nitrates, phosphates, and the like as representative of the inorganic salts and citrate, tartarate, maleate, as representative of organic salt.

An object of this invention is to provide products which are useful in the control of RNA-type viruses. A further object of this invention is to provide processes to make the desired benzimidazole derivatives containing the chosen combinations of substituents. A still further object of this invention is to provide alternate processes relating to the preparation of specific substituted benzimidazoles. Another object is to provide compositions containing the compounds which are useful in treating Rhinoviruses. Other objects will become apparent upon further reading of this disclosure.

PREFERRED EMBODIMENTS OF THE INVENTION

One aspect of the preferred embodiments of the invention is represented by the following structural formula:

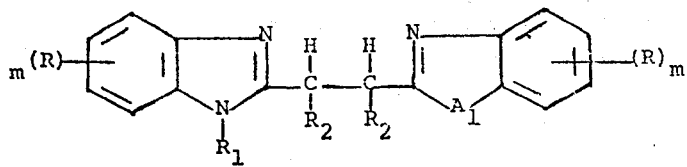

II wherein each R is loweralkoxy, haloloweralkoxy, loweralkyl, or when m is 2, the R groups together may form a methylenedioxy group; $R_1$ is hydrogen or loweralkyl; each $R_2$ is hydrogen or hydroxyl, $A_1$ is oxygen, sulfur, or carbon, and m is 0, 1 or 2. Compounds representative of this aspect of the invention are:

[1S, 2R]-1-(5-methoxy-2-benzimidazolyl)-2-(6-methoxy-2-benzothiazolyl)-1,2-ethanediol

[1S, 2R]-1-(5-methoxy-2-benzimidazolyl)-2-(6-methoxy-2-(6-methoxy-2-benzothiazolyl)-1,2-ethanediol 1-(5,6-dimethoxy-2-benzimidazolyl)-2-(6-methoxy-2-benzoxazolyl)-ethanol 1-(5-methoxy-1-methyl-2-benzimidazolyl)-2-(6-methoxy-2-benzoxazolyl)-ethane 1-(5,6-methylenedioxy-2-benzimidazolyl)-2-(5-methoxy-2-indolyl)-ethanol 1-(5-trifluoromethoxy-2-benzimidazolyl)-2-(5-methoxy-2-indolyl)-ethanediol 1-(5-methoxy-2-benzimidazolyl)-2-(5-methoxy-2-indolyl)-1,2-ethanediol 1-(5-ethoxy-1-ethyl-2-benzimidazolyl)-2-(5-ethoxy-2-indolyl)-1,2-ethanediol A second aspect of the preferred embodiment of the instant invention is demonstrated by the following structural formula:

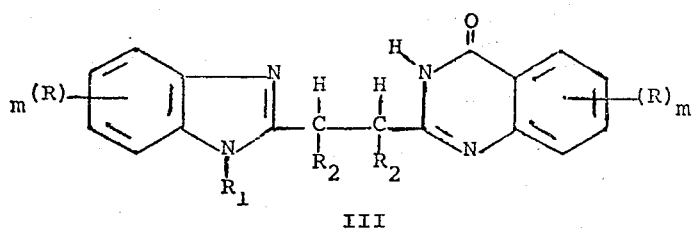

III wherein each R is loweralkoxy, haloloweralkoxy, loweralkyl or when m is 2, the R groups together may form a methylenedioxy group; $R_1$ is hydrogen or loweralkyl, and each $R_2$ is hydrogen or hydroxyl. Compounds representative of this aspect of the invention are:

1-(5-methoxy-2-benzimidazolyl)-2-[2-4(3H)-quinazolinonyl]-1,2-ethanediol dihydrochloride 1-(5-ethoxy-2-benzimidazolyl)-2-[2-4(3H)-quinazolinonyl]-1,2-ethanediol dihydrochloride 1-(5-methoxy-6-methyl-2-benzimidazolyl)-2-[2-4(3H)-quinazolinonyl]-1,2-ethanediol dihydrochloride 1-(5-trifluoromethoxy-2-benzimidazolyl)-2-[2-4(3H)-7-methoxyquinazolinonyl]-1,2-ethanediol dihydrochloride with the o-phenylene diamine or derivative thereof, the order of reaction being of no consequence. For purposes of this discussion the carboxylic acid derivatives are defined as including the aldehyde, the Shiff base derived therefrom, and the nitrile as well as the more common carboxylic acid derivatives such as esters, amides and the like. The butane dicarboxylic acid or derivative contains as an integral part thereof the atoms which make up the central linking group. This linking group may also be substituted as defined supra. The hydroxyl group may, however, be in a protected form such as an acyl derivative thereof if such a form is more convenient for the facilitation of the reaction. The reaction is best described by referring to the following flow chart.

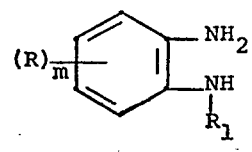

IV

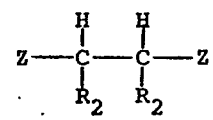

V

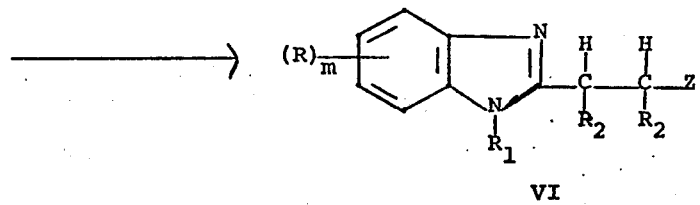

VI

VI + 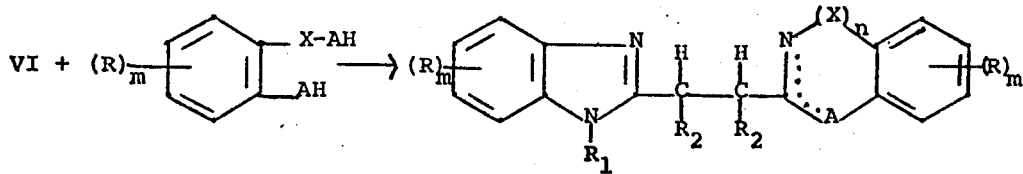

VII              VIII

The compounds of the instant invention are prepared by contacting an o-phenylene diamine or substituted derivative thereof with a butane dicarboxylic acid or derivative thereof, thus forming a benzimidazolyl carboxylic acid derivative. This compound is then contacted with a phenol derivative or thio analogue thereof forming the second heterocyclic ring. In the alternative the dicarboxylic acid may be contacted first with the phenol derivative or thio analogue thereof and then wherein R, $R_1$, $R_2$, X, A, m, and n are as previously defined and each Z is a carboxylic acid derivative group as previously defined. The particular identity of Z will depend upon the particular group it is reacting with on the benzenoid ring and what heterocyclic group is desired to be formed. When Z is a nitrile group the group —X—AH of structure V must become —COOH— and when Z is not a nitrile, the group —X—AH becomes —X—$NH_2$.

When $R_2$ is a hydroxyl group it is often advantageous, although not always necessary, to protect it from attack by any of the reagents or reactants used in the reaction. The hydroxyl group is most readily protected by preparing the ester derivative. The ester derivative is prepared by methods well known to those skilled in the art and is relatively immune from attack by those reagents employed in the instant reaction. However, when the hydroxyl group no longer would have been subject to attack, the ester group may be removed by methods well known to those skilled in the art, affording the hydroxyl group.

The reaction sequence above is a general one with the possibility of a large number of variations. The specific reaction conditions and techniques involved in said reaction sequence, are best seen by an analysis of the preparation of the preferred embodiments of this invention. It should be realized however, that slight variations in the processes described infra will yield other compounds than the preferred embodiments.

The benzimidazole heterocyclic ring, present in all of the preferred embodiments of the invention may be prepared by contacting an o-phenylene diamine with a carboxylic acid, a salt of a carboxylic acid such as an alkali metal salt, a carboximidate hydrohalide, and the like. When there is a substituent desired at the 1-position of the benzimidazole nucleus the o-phenylene diamine starting material is usually chosen such that the desired substituent is already affixed thereon. In some instances the substituent may be subsequently inserted on the molecule however, the preferred route is to choose a previously substituted starting material. It has been found that the alternative route affords too great an opportunity for competing reactions while the preferred route does not. The reaction is effected by hydrolytic coupling of the two reactants by removing water by the use of dicyclohexylcarbodiimide, or where the reaction is more facile, by combining the reagents and heating in a solvent inert to reaction at a temperature of from room temperature to the reflux temperature of the solvent employed. Typical solvents which have proven useful are loweralkanols such as methanol, ethanol, propanol, and the like; or other polar solvents such as dimethyl formamide, tetrohydrofuran, dioxane, and dimethylsulfoxide. The reaction mixture is heated for a duration of from 5 minutes to 5 hours, depending upon the reactivity of the particular reactants and the temperature at which the reaction is run. The reaction may be run in one step in which the reactants are coupled and dehydrated simultaneously or the steps may be separated with or without isolation and purification of the intermediate. The reaction may be run in a reaction medium of either acid, basic, or neatral pH. The particular choice of pH is dependent upon the solubility and stability of the reactants. The reaction is seen to work equally well in any pH of from 3 to 9 where the reactants are soluble in the reaction medium at the particular pH chosen.

The benzothiazolyl heterocyclic ring is synthesized by choosing a carboxylic acid or derivative, an aldehyde or derivative, or a nitrile as one reactant and an o-aminothiophenol, optionally substituted, as the other reactant. The reaction is affected by dissolving both reactants in a solvent inert to reaction and heating the mixture at a temperature of from room temperature to the reflux temperature of the solvent for a duration of from ½ to 10 hours. Suitable solvents have proven to be aromatic hydrocarbons such as benzene or toluene; loweralkanols such as methanol, ethanol, propanol; and the like. Upon completion of the heating period, the reaction is worked up and the product isolated by techniques known to those skilled in the art. The reaction is often exothermic and a rise in temperature is noted as the two reactants are combined in a single solvent. Where the solvent allows, the progress of the reaction may be followed by azeotroping the water liberated during the course of the reaction. The theoretical amount of water to be liberated can be calculated and when that amount is taken from the reaction, the reaction is complete. Particularly suitable solvents for this use are non-water miscible solvents such as benzene and toluene. As an alternative, an agent may be added to the reaction mixture which is capable of absorbing the water liberated. The agent, however, must not interfere with the reaction or react with any of the reactants. Suitable for this use are anhydrous inorganic salts and molecular sieves which have a strong affinity for water or crystallization. Particularly suitable are anhydrous potassium carbonate, anhydrous magnesium carbonate, anhydrous calcium sulfate, anhydrous sodium carbonate, and the like.

The benzoxazolyl heterocyclic ring is prepared in a manner analogous to the benzothiazolyl heterocyclic ring. The benzenoid reactant is an o-aminophenol which may be optionally substituted. The reaction conditions for the o-aminophenol and o-aminothiophenol reactions are the same. There is no substantial difference in reactivity noticed between the phenol and the thiophenol reaction. Thus, the reaction temperatures, reaction times and reaction solvents are interchangeable.

The indolyl compound is prepared somewhat differently from the benzothiazolyl or benzoxaxolyl derivative. Compound IV is contacted with a 3-(2-indolyl)-propionic acid derivative in place of Compound V. The preparation of said 3-(2-indolyl)-propionic acid derivatives is known to those skilled in the art. The reaction is best represented by the following reaction scheme:

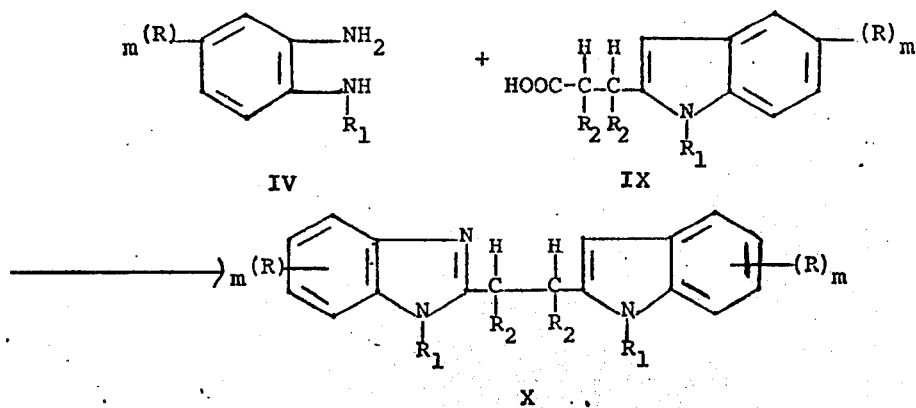

wherein each of R, $R_1$, $R_2$ and m is as previously defined. The reaction conditions of this reaction are the same as the reaction conditions for the coupling and ring closure of the benzimidazole ring discussed in connection with the previous benzimidazole synthesis may be employed for the preparation of Compound X.

The quinazolinonyl heterocyclic ring is prepared by contacting a carboxylic acid derivative with anthranilic acid or an anthranilamide which may be optionally substituted. Where the non-benzenoid reactant is a nitrile, the benzenoid reactant is anthranilic acid. The nitrogen of the nitrile group forms the ring nitrogen and there is thus no need for a nitrogen atom on the carbonyl of the benzenoid reactant. Where the benzenoid reactant is anthranilamide or a derivative thereof the reaction is run in an inert solvent. Aromatic hydrocarbons, such as benzene or toluene; a loweralkanol such as methanol, ethanol, propanol, and the like; or other organic solvents such as tetrahydrofuran or dimethylformamide have proven useful. The reaction is run at a temperature of from room temperature to the reflux temperature of the solvent employed for a duration of from ½ to 10 hours, the duration being inversely proportional to the temperature at which the reaction is run. The reaction is worked up and the product isolated by techniques known to those skilled in the art. The water liberated from the reaction may be removed from the reaction medium as previously discussed using the azeotropic distillation methods or the internal water absorbant method.

When the non-benzenoid reactant if a nitrile and the benzenoid reactant is an anthranilic acid or substituted derivative thereof, the reaction proceeds somewhat differently. The two reactants are combined without the use of a solvent and the mixture heated at a temperature of from 100°C. or a temperature sufficient to melt both reactants, to 200°C. or a temperature below which extensive decomposition occurs. The removal of water liberated during the reaction has not proven to be necessary as it does not interfere with the reaction. However, the water can be easily removed by simple distillation. A solvent has not proven to be necessary in this reaction in general. However, in certain cases where either of the reactants or the product is susceptible to decomposition at the temperature at which the reaction is to be run, a solvent may be employed. Suitable solvents have proven to be higher boiling inert organic solvents such as benzene, toluene, xylene, dimethyl formamide and the like. The duration of the non-solvent reaction is from 5 minutes to 1 hour with most reactions being completed in from 10 to 20 minutes. Where a solvent must be employed, the duration of the reaction is greater, up to 10 hours. The reaction is worked up and the products isolated by techniques known to those skilled in the art.

The non-benzenoid reactant as hereinabove mentioned may be a carboxylic acid, a derivative thereof, an aldehyde, a derivative thereof, or a nitrile. The reactant is chosen such that it will provide another reactive group for the second heterocyclic ring closure as well as providing for the proper substituents on the centrally located linking group. For the preferred embodiments of the invention suitable reactants have proven to be tartaric anhydride which is more readily used in the protected form of diacetyl tartaric anhydride, 3-cyanopropylcarboximidate hydrochloride, and the like. Dicarboxylic acids may be used in which only one carboxy group is reacted at any one time.

As hereinabove mentioned, the products of the instant invention are generally isolated as the salt form. Acid addition salts have proven to be useful with the hydrohalide derivatives preferred. The salt is prepared by dissolving the free base in an inert solvent in which it is freely soluble and in which the salt is of limited solubility. Non-polar solvents have proven most useful, however polar solvents are also beneficial. Ether, chloroform, benzene and the like have proven useful with loweralkanols such as methanol, ethanol, and propanol also useful where the salt is not appreciably soluble therein. The salt is prepared by adding to the solution of the free base a molar equivalent or slight excess of the anhydrous acid. A concentrated aqueous solution of the acid may be used where the solvent is miscible with water. The salt generally spontaneously precipitates and is isolated and purified by techniques known to those skilled in this art.

In order that the invention might be more fully understood the following examples are presented which should not be construed as being limitative of the invention.

EXAMPLE 1

[2R,3R]-2,3-diacetoxy-3-(6-methoxy-2-benzothiazolyl)-propionic acid, sodium salt 2-Amino-5-methoxythiophenol (5.72 g., 0.0369 m) is dissolved in 100 ml. of benzene and added to a suspension of 7.98 g. (0.0369 m.) of L-diacetyl tartaric anhydride dissolved in 100 ml. of benzene. A slight exotherm is noted upon the combination. The mixture is refluxed for 1 hour during which time a solid material precipitated. On cooling, the insoluble material is filtered and washed with benzene. 429 Ml. of hexane is then added to the filtrate. The precipitated solid is filtered, washed with hexane, and dried in vacuo at room temperature. The dry crude product is suspended in 45 ml. of benzene and extracted with aqueous ammonium bicarbonate. The benzene layer is then washed with 10 ml. of water. The combined aqueous layers are washed twice with 10 ml. portions of benzene and lyopholized. The crude ammonium salt is further dried by washing it with methanol followed by a washing with hexane. The residue is dissolved in 33 ml. of methanol and treated with 3.3 g. of sodium methoxide. The reaction mixture spontaneously heated to 47°C. during which time the product crystallized. The reaction mixture is cooled to 30°C. and maintained at that temperature for an hour, during which time crystallization becomes complete. The product is filtered, washed 3 times with 10 ml. portions of methanol, and dried in vacuo at 50°C. affording the sodium salt of [2R,3R]-2,3-dihydroxy-3-(6-methoxy-2-benzothiazolyl)propionic acid, m.p. 233° to 235°C.

The above sodium salt (6.5 g., 0.022 m) is added to a solution of 2.1 ml. of pyridine and 65 ml. of acetic anhydride under an atmosphere of nitrogen. The reaction mixture is stirred for 90 minutes at 25°C. and added to 1500 ml. of ether. The precipitated solid is filtered, washed with ether, and dried in vacuo at 50°C. affording [2R,3R]-2,3-diacetoxy-3-(6-methoxy-2-benzothiazolyl)propionic acid, sodium salt, m.p. 210°–211°C. (with dec.)

When in the above procedure 2-amino-5-methylthiophenol, 2-amino-5-chlorothiophenol or 2-amino-5-ethoxy-thiophenol is employed in place of 2-amino-5-methoxythiophenol there is obtained [2R,3R]-2,3-diacetoxy-3-(6-methyl-2-benzothiazolyl)propionic acid sodium salt, [2R,3R]-2,3-diacetoxy-3-(6-chloro-2-benzothiazolyl)-propionic acid sodium salt and [2R,3R]-2,3-diacetoxy-3-(6-ethoxy-2-benzothiazolyl)propionic acid sodium salt, respectively.

EXAMPLE 2

[2R,3R]-2,3-diacetoxy-3-(6-methoxy-2-benzothiazolyl)-propion-[2-amino-4(5)-methoxy]-anilide 4-Methoxy-o-phenylene diamine (0.647 g., 0.0047 m.) is dissolved in 15 ml. of dimethylformamide. To the resultant solution is added 0.405 ml. (0.0047 m.) of concentrated hydrochloric acid. [2R,3R]-2,3-diacetoxy-3-(6-methoxy-2-benzothiazolyl)-propionic acid sodium salt is then added to the acidified solution. The reaction mixture is stirred for 5 minutes and 0.947 g. (0.0047 m.) of dicyclohexylcarbodiimide is added at room temperature. The resultant reaction mixture is stirred for 3½ hours at room temperature during which time a solid precipitated. The reaction mixture is filtered separating dicyclohexylurea and the filtrate is added to 100 ml. of cold (5°C.) water. 100 Ml. of methylene chloride is added to the aqueous phase and the pH of the aqueous phase is adjusted to form 7.0 to 8.0 with aqueous sodium bicarbonate. The layers are separated and the aqueous layer washed 4 times with 25 ml. poritions of methylene chloride. The combined organic layers are washed 5 times with 15 ml. of cold water, dried over anhydrous sodium sulfate and concentrated to dryness in vacuo. The residue is chromatographically purified on silica gel eluted with benzene:acetone (8:2) affording [2R,3R]-2,3-diacetoxy-3-(6-methoxy-2-benzothiazolyl)-propion[2-amino-4(5)-methoxy]anilide, m.p. 175°–179°C.

When in the above procedure [2R,3R]-2,3-diacetoxy-3-(6-methyl-2-benzothiazolyl)propionic acid sodium salt, [2R,3R]-2,3-diacetoxy-3-(6-chloro-2-benzothiazolyl)-propionic acid sodium salt or [2R,3R]-2,3-diacetoxy-3-(6-ethoxy-2-benzothiazolyl)propionic acid sodium salt, is employed in place of [2R,3R]-2,3-diacetoxy-3-(6-methoxy-2-benzothiazolyl)propionic acid sodium salt there is obtained [2R,3R]-2,3-diacetoxy-3-(6-methyl-2-benzothiazolyl)-propionic acid sodium salt there is obtained [2R,3R]-2,3-diacetoxy-3-(6-methyl-2-benzothiazolyl)-propion-[2-amino-4(5)-methoxy]anilide, [2R,3R]-2,3-diacetoxy-3-(6-chloro-2-benzothiazolyl)-propion-[2-amino-4(5)-methoxy]-anilide and [2R,3R]-2,3-diacetoxy-3-(6-ethoxy-2-benzothiazol)-propion-[2-amino-4(5)-methoxy]-anilide, respectively.

EXAMPLE 3

[2R,3R]-2,3-dihydroxy-3-(6-methoxy-2-benzothiazolyl)-propion-[2-amino-4(5)-methoxy]-anilide

[2R,3R]-2,3-diacetoxy-3-(6-methoxy-2-benzothiazolyl)propion[2-amino-4(5)-methoxy]anilide (0.422 g., 0.0094 m.) is suspended in 13 ml. of methanol under an atmosphere of nitrogen. 0.001 g. of sodium methoxide is added to the resultant solution, upon which crystallization spontaneously occurs. The suspension is stirred for 2½ hours at room temperature and filtered. The solid material is washed with cold methanol and hexane and dried in vacuo at 50°C. affording [2R,3R]-2,3-dihydroxy-3-(6-methoxy-2-benzothiazolyl)-propion-[2-amino-4(5)-methoxy]anilide, m.p. 232° to 233°C. (the dihydrochloride melts at 217°–218°C. with dec.)

When in the above procedure [2R,3R]-2,3-diacetoxy-3-(6-methyl-2-benzothiazolyl)propion[2-amino-4(5)-methoxy]-anilide, [2R,3R]-2,3-diacetoxy-3-(6-chloro-2-benzothiazolyl)-propion[2-amino-4(5)-methoxy]-anilide or [2R,3R]-2,3-diacetoxy-3-(6-ethoxy-2-benzothiazolyl)propion[2-amino-4(5)-methoxy]anilide is employed in place of [2R,3R]-2,3-diacetoxy-3-(6-methoxy-2-benzothiazolyl)propion[2-amino-4(5)-methoxy]anilide there is obtained [2R,3R-]-2,3-dihydroxy-3-(6-methyl-2-benzothiazolyl)propion[2-amino-4(5)-methoxy]anilide, [2R,3R]-2,3-dihydroxy-3-(6-chloro-2-benzothiazolyl)-propion-[2-amino-4(5)-methoxy]-anilide, and [2R,3R]-2,3-dihydroxy-3-(6-ethoxy-2-benzothiazolyl)-propion-[2-amino-4(5)-methoxy]-anilide, respectively.

EXAMPLE 4

[1S,2R]-1-(5-methoxy-2-benzimidazole)-2-(6-methoxy-2-benzothiazolyl)-1,2-ethanediol

[2R,3R]-2,3-dihydroxy-3-(6-methoxy-2-benzothiazolyl)propion[2-amino-4(5)-methoxy]anilide (0.300 g., 0.00077 m.) is suspended in 6 ml. of glacial acetic acid under nitrogen. The reaction mixture is stirred at 98°C. for 45 minutes during which time complete solution is obtained. The reaction mixture is cooled and lyopholized and the residue washed with aqueous sodium bicarbonate followed by water. The solid material is dried in air. The crude product is suspended in methanol at room temperature, stirred for 5 minutes and filtered. The solid material is dried in vacuo affording [1S,2R]-1-(5-methoxy-2-benzimidazolyl)-2-(6-methoxy-2-benzothiazolyl)-1,2-ethanediol, m.p. 229°–231.5°C. The free base is suspended in a solution of hydrogen chloride and methanol affording the dihydrochloride, m.p. 182° to 184°C.

When in the above procedure there is employed [2R,3R]-2,3-dihydroxy-3-(6-methyl-2-benzothiazolyl)-propion-[2-amino-4(5)-methoxy]-anilide, [2R,3R]-2,3-dihydroxy-3-(6-chloro-2-benzothiazolyl)-propion-[2-amino-4(5)-methoxyanilide or [2R,3R]-2,3-dihydroxy-3-(6-ethoxy-2-benzothiazolyl)propion[2-amino-4(5)-methoxy]-anilide, in place of [2R,3R]-2,3-dihydroxy-3-(6-methoxy-2-benzothiazolyl)-propion-[2-amino-4(5)-methoxy]-anilide there is obtained [1S,2R]-1-(5-methoxy-2-benzimidazol)-2-(6-methyl-2-benzothiazolyl)-1,2-ethanediol, [1S,2R]-1-(5-methoxy-2-benzimidazol)-2-(6-chloro-2-benzothiazolyl)-1,2-ethanediol, or [1S,2R]-1-(5-methoxy-2- benzimidazol)-2-(6-ethoxy-2-benzothiazolyl)-1,2-ethanediol, respectively.

EXAMPLE 5

5-Methoxy-2-(β-cyanoethyl)benzimidazole 43.8 G. (0.296 m.) of methyl-3-cyanopropyl carboximidate hydrochloride is dissolved in 180 ml. of absolute ethanol and the solution cooled to 5°C. The above cooled ethanol solution is added to a pre-cooled solution (5°C.) of 40.8 g. (0.296 m.) of 4-methoxy-o-phenylenediamine in 162 ml. of absolute ethanol over a period of 30 minutes. The reaction mixture is then refluxed for 40 minutes, cooled to room temperature, and filtered. The combined filtrates are concentrated in vacuo. 410 Ml. of water is added to the residue and the crystalline soluble material is filtered, washed with water, and dried in vacuo to 40°C. Recrystallization from chloroform affords 5-methoxy-2-(β-cyanoethyl)-benzimidazole, m.p. 139° to 141.5°C.

When in the above procedure 4-methyl-o-phenylene diamine, 4-chloro-o-phenylenediamine, 4-methoxy-o-phenylenediamine, 4,5-methylenedioxy-o-phenylenediamine, 4,5-dimethoxy-o-phenylenediamine, 4-methylthio-o-phenylenediamine or 4-trifluoromethoxy-o-phenylenediamine is employed in place of 4-methoxy-o-phenylenediamine there is obtained 5-methyl-2-(β-cyanoethyl)-benzimidazole, 5-chloro-2-(β-cyanoethyl)-benzimidazole, 5-ethoxy-2-(β-cyanoethyl)-benzimidazole, 5-methylthio-2-(β-cyanoethyl)-benzimidazole, 5,6-methylenedioxy-2-(β-cyanoethyl)-benzimidazole, 5,6-dimethoxy-2-(β-cyanoethyl)benzimidazole and 5-trifluoromethoxy-2-(β-cyanoethyl)-benzimidazole, respectively.

EXAMPLE 6

2-[2-(5-methoxy-2-benzimidazolyl)ethyl]-4(3H)-quinazolinone 0.500 g. (0.0025 m.) of 5-methoxy-2-(β-cyanoethyl)-benzimidazole and 0.342 g. (0.0025 m.) of anthranilic acid are combined and immersed in an oil bath preheated to 150°C. The reaction mixture melted and after 15 minutes resolidified. The oil bath is removed and the solid material is slurried with hot methanol, cooled, filtered, washed with methanol and hexane and dried in vacuo at 50°C. The resultant 2-[2-(5-methoxy-2-benzimidazolyl)-ethyl]-4(3H)-quinazolinone melts at 274° to 275°C. with decomposition, and can be converted to the hydrochloride salt, m.p. 231° to 232°C. with decomposition, by dissolving the free base in methanol and treating the solution with anhydrous hydrogen chloride.

When in the above procedure 5-methyl-2-(β-cyanoethyl)benzimidazole, 5-chloro-2-(β-cyanoethyl)-benzimidazole, 5-ethoxy-2-(β-cyanoethyl)benzimidazole, 5-methylthio-2-(β-cyanoethyl)benzimidazole, 5,6-methylenedioxy-(2-β-cyanoethyl)benzimidazole, 5,6-dimethoxy-2-(β-cyanoethyl)benzimidazole, and 5-trifluoromethoxy-2-(β-cyanoethyl)-benzimidazole is employed in place of 5-methoxy-2-(β-cyanoethyl)benzimidazole there is obtained 2-[2-(5-methyl-2-benzimidazolyl)ethyl]-4(3H)-quinazolinone, 2-[2-(5-chloro-2-benzimidazolyl)ethyl]-4-(3H)-quinazolinone, 2-[2-(5-ethoxy-2-benzimidazolyl)-ethyl]-4(3H)-quinazolinone, 2-[2-(5-methylthio-2-benzimidazolyl)ethyl]-4(3H)-quinazolinone, 2-[2-(5,6-methylenedioxy-2-benzimidazolyl)ethyl]-4(3H)-quinazolinone, 2-[2-(5,6-dimethoxy-2-benzimidazolyl)-ethyl]-4(3H)-quinazolinone, and 2-[2-(5-trifluoromethoxy-2-benzimidazolyl)ethyl]-4(3H)-quinazolinone, respectively.

EXAMPLE 7

Ethyl-3-(5-methoxy-2-benzimidazolyl)propionimidate dihydrochloride 4.0 G. (0.020 m.) of 2(β-cyanoethyl)-5-methoxybenzimidazole and 1.28 ml. (1.01 g., 0.022 m.) of ethanol are combined in 20 ml. of chloroform and the resultant solution cooled to 5°C. Anhydrous hydrogen chloride is bubbled into the reaction mixture, maintaining the temperature at 5°C. until a total of 2.4 g. (0.066 m.) of hydrogen chloride has been added. The reaction mixture is stirred at 5°C. overnight. 70 Ml. of ether is added to the reaction mixture which precipitated the product. The reaction mixture is warmed to room temperature and filtered. The solid material is washed with ether and dried in vacuo at 25°C., affording ethyl-3-(5-methoxy-2-benzimidazolyl)-propionimidate dihydrochloride, m.p. 232°–234°C.

When in the above procedure 2-(β-cyanoethyl)-4,5-dimethoxybenzimidazole or 2-(β-cyanoethyl)-4,5-dimethyl-benzimidazole is employed in place of 2-(β-cyanoethyl)-5-methoxybenzimidazole there is obtained ethyl-3-(4,5-dimethoxy-2-benzimidazolyl)propionimidate dihydrochloride and ethyl-3-(4,5-dimethyl-2-benzimidazolyl)-propionimidate dihydrochloride.

EXAMPLE 8

6-Methoxy-2-[2-(5-methoxy-2-benzimidazolyl)-ethyl]-benzoxazole dihydrochloride 0.875 g. (0.00274 m.) of ethyl-3-(5-methoxy-2-benzimidazolyl)propionimidate dihydrochloride is added to a mixture of 0.500 g. (0.00285 m.) of 2-amino-5-methoxyphenol hydrochloride and 1.2 g. (0.0087 m.) of anhydrous potassium carbonate in 10 ml. of absolute ethanol. The reaction mixture is stirred at room temperature for 30 minutes and then refluxed for 90 minutes. The reaction mixture is cooled and the insoluble material filtered and the filtrate concentrated in vacuo to a small volume (2 ml.). To this residue is added 10 ml. of water and the precipitated product is filtered, washed with water, and dried in vacuo. The residue is dissolved in methylene chloride into which is bubbled anhydrous hydrogen chloride, spontaneously precipitating 6-methoxy-2-[2-(5-methoxy-2-benzimidazolyl)-ethyl]-benzoxazole dihydrochloride, m.p. 230°–231.5°C. with decomposition.

When in the above procedure there is employed ethyl-3-(4,5-dimethoxy-2-benzimidazolyl)propionimidate dihydrochloride or ethyl-3-(4,5-dimethyl-2-benzimidazolyl)-propionimidate dihydrochloride in place of ethyl-3-(5-methoxy-2-benzimidazolyl)propionimidate dihydrochloride there is obtained 6-methoxy-2-[2-(4,5-dimethoxy-2-benzimidazolyl)-ethyl]-benzoxazole dihydrochloride and 6-methoxy-2-[2-(4,5-dimethyl-2-benzimidazolyl)-ethyl]-benzoxazole dihydrochloride.

EXAMPLE 9

[αR,βR]-diacetyltartar-1-carbamoyl-anilide 5.5 G. (0.0407 m.) of anthranilamide and 8.8 g. (0.0407 m.) of L-diacetyltartaric anhydride are combined in 100 ml. of tetrahydrofuran and refluxed for 1 hour. The reaction mixture is cooled and concentrated in vacuo. The residue is re-dissolved in 45 ml. of tetrahydrofuran and filtered. The filtrate is treated with 400 ml. of methylene chloride, resulting in a solid precipitate. The mixture is allowed to stand at room temperature for 30 minutes completing the precipitation. The product is filtered and air dried affording [αR,βR]-diacetyltartar-(1-carbamoyl)anilide, m.p. 186° to 188°C. with dec.

When in the above procedure 5-methyl anthranilamide, 5-chloroanthraniliamide, 5-ethoxyanthranilamide, or 5-methylthioanthranilamide is employed in place of anthranilamide there is obtained [αR,βR]-diacetyltartar-2-carbamoyl-5-methylanilide, [αR,βR]-diacetyltartar-2-carbamoyl-5-chloroanilide, [αR,βR]-diacetyltartar-2-carbamoyl-5-methoxyanilide and [αR,βR]-diacetyltartar-2-carbamoyl-5-methylthioanilide, respectively.

EXAMPLE 10

[2R,3S]-2,3-dihydroxy-3-[2-4(3H)-quinazolinonyl]-propionic acid 6.0 G. (0.017 m.) of [αR,βR]-diacetyltartar-2-carbamoyl anilide is dissolved in 75 ml. of 3 percent aqueous sodium hydroxide (0.055 m.) and warmed on a steam bath for 1 hour. The reaction mixture is cooled and concentrated in vacuo to a damp solid. The residue is suspended in 20 ml. of 4N hydrochloric acid and filtered. The solid material is washed twice with 5 ml. portions of water and air dried. The drying is complete in vacuo at 50°C., affording [2R,3S]-2,3-dihydroxy-3-[2-4(3H)-quinazolinonyl]-propionic acid, m.p. 197° to 199°C. with dec.

When in the above procedure [αR,βR]-diacetyltartar-2-carbamoyl-5-methylanilide, [αR,βR]-diacetyltartar-2-carbamoyl-5-chloroanilide, [αR,βR]-diacetyltartar-2-carbamoyl-5-methoxyanilide or [αR,βR]-diacetyltartar-2-carbamoyl-5-methylthioanilide is employed in place of [αR,βR]-diacetyltartar-1-carbamoylanilide there is obtained [2R,3S]-2,3-dihydroxy-3-[7-methyl-2-(3H)-quinazolinonyl]propionic acid, [2R,3S]-2,3-dihydroxy-3-[7-chloro-2-4(3H)-quinazolinonyl]-propionic acid, [2R,3S]-2,3-dihydroxy-2-[7-methoxy-2-4(3H)-quinazolinonyl]-propionic acid, and [2R,3S]-2,3-dihydroxy-3-[7-methylthio-2-4(3H)-quinazolinonyl]-propionic acid, respectively.

EXAMPLE 11

[2R,3S]-2,3-dihydroxy-3-[2-4(3H)-quinazolinonyl]-propion-[2-amino-4(5)-methoxy]-anilide 1.94 G. (0.0141) of 4-methoxy-o-phenylenediamine and 3.0 g. (0.0128 m.) of [2R,3S]-2,3-dihydroxy-3-[2-4(3H)-quinazolinonyl]propionic acid are combined in 35 ml. of dimethylformamide under an atmosphere of nitrogen and treated with 2.98 g. (0.141 m.) of dicyclohexylcarbodiimide at 25°C. The reaction mixture is stirred for 5 hours at room temperature and the precipitated dicyclohexylurea filtered. The filtrate is concentrated in vacuo at 55°C., affording a dark gum. This material is dissolved in 40 ml. of chloroform, affecting the immediate precipitation of a solid. The suspension is stirred overnight at room temperature and filtered. The solid material is washed 4 times with 40 ml. portions of chloroform and once with a 40 ml. portion of ether. The solid material is dried in vacuo affording [2-R,3S]-2,3-dihydroxy-3-[2-4(3H)-quinazolinonyl]-propion-[2-amino-4(5)-methoxy]-anilide, m.p. 206°–208°C.

When in the above procedure [2R,3S]-2,3-dihydroxy-3-[7-methyl-2-4(3H)-quinazolinonyl]-propionic acid, [2R,3S]-2,3-dihydroxy-3[7-chloro-2-4(3H)-quinazolinonyl]propionic acid, [2R,3S]-2,3-dihydroxy-3[7-methoxy-2-4(3H)-quinazolinonyl]-propionic acid, or [2R,3S]-2,3-dihydroxy-3-[7-methylthio-2-4(3H)-quinazolinonyl]-propionic acid are employed in place of [2R,3S]-2,3-dihydroxy-3[2-4(3H)-quinazolinonyl]-propionic acid there is obtained [2R,3S]-2,3-dihydroxy-3-[7-methyl-2-4(3H)-quinazolinonyl]-propion-[2-amino-4(5)-methoxy]-anilide, [2R,3S]-2,3-dihydroxy-3-[7-chloro-2-4(3H)-quinazolinonyl]-propion-[2-amino-4(5)-methoxy]-anilide, [2R,3S]-2,3-dihydroxy-3-[7-methoxy-2-4(3H)-quinazolinonyl]-propion-[2-amino-4(5)-methoxy]-anilide and [2R,3S]-2,3-dihydroxy-3-[7-methylthio-2-4(3H)-quinazolinonyl]-propion-[2-amino-4(5)-methoxy]-anilide, respectively.

EXAMPLE 12

1-(5-methoxy-2-benzimidazolyl)-2-[2-4(3H)-quinazolinonyl]-1,2-ethanediol dihydrochloride 0.750 G. (0.002 m.) of [2R,3S]-2,3-dihydroxy-3-[2-4(3H)-quinazolinonyl]-propion-[2-amino-4(5)-methoxy]-anilide is suspended in 100 ml. of acetic acid and stirred under an atmosphere of nitrogen for 90 hours at room temperature. The reaction mixture is at this time a clear solution which is lyopholized and the residue is washed with ether. The product is dissolved in isopropanol and treated with anhydrous hydrogen chloride in methanol affording 1-(5-methoxy-2-benzimidazolyl)-2-[2-4(3H)-quinazolinonyl]-1,2-ethanediol dihydrochloride, m.p. 268°–270°C. with dec.

When in the above procedure [2R,3S]-2,3-dihydroxy-3-[7-methyl-2-4(3H)-quinazolinonyl]-propion-[2-amino-4(5)-methoxy]-anilide, [2R,3S]-2,3-dihydroxy-3-[7-chloro-2-4(3H)-quinazolinonyl]-propion-[2-amino-4(5)-methoxy]-anilide, [2R,3S]-2,3-dihydroxy-3-[7-methoxy-2-4(3H)-quinazolinonyl]-propion-[2-amino-4(5)-methoxy]-anilide or [2R,3S]-2,3-dihydroxy-3-[7-methylthio-2-4(3H)-quinazolinonyl]-propion-[2-amino-4(5)-methoxy]-anilide is employed in place of [2R,3S]-2,3-dihydroxy-3-[2-4(3H)-quinazolinonyl]-propion-[2-amino-4(5)-methoxy]-anilide there is obtained 1-(5-methoxy-2-benzimidazolyl)-2-[7-methyl-2(3H)-quinazolinonyl]-1,2-ethanediol dihydrochloride, 1-(5-methoxy-2-benzimidazolyl)-2-[7-chloro-2-4(3H)-quinazolinonyl]-1,2-ethanediol dihydrochloride, 1-(5-methoxy-2-benzimidazolyl)-2-[7-methoxy-2-4(3H)-quinazolinonyl]-1,2-ethanediol dihydrochloride, 1-(5-methoxy-2-benzimidazolyl)-2-[7-methylthio-2-4(3H)-quinazolinonyl]-1,2-ethanediol dihydrochloride, respectively.

EXAMPLE 13

6-Methoxy-2-[2-(5-methoxy-2-benzimidazolyl)-ethyl]-benzothiazole dihydrochloride 0.500 G. (0.00156 m.) of ethyl-3-(5-methoxy-2-benzimidazolyl)propionimidate dihydrochloride is added to a mixture of 0.315 g. (0.00285 m.) of 2-amino-5-methoxythiophenol hydrochloride and 0.69 g. (0.005 m.) of anhydrous potassium carbonate, dissolved in 5 ml. of absolute methanol. The reaction mixture is stirred at room temperature for 45 minutes and then refluxed for 90 minutes. The reaction mixture is cooled and the insoluble materials filtered. The filtrate is concentrated in vacuo. 10 Ml. of water is added to the residue and the precipitated product filtered, washed with water and dried. The residue is dissolved in methanol and combined with a solution of anhydrous hydrogen chloride in methanol, affording 6-methoxy-2-[2-(5-methoxy-2-benzimidazolyl)-ethyl]-benzothiazole dihydrochloride, m.p. 223° to 223.5°C. with decomposition.

When in the above procedure 2-amino-5-methylthiophenol hydrochloride, 2-amino-5-chlorothiophenol hydrochloride and 2-amino-5-ethoxythiophenol hydrochloride is employed in place of 2-amino-5-methoxythiophenol hydrochloride there is obtained 6-methyl-2-[2-(5-methoxy-2-benzimidazolyl)-ethyl]-benzothiazole dihydrochloride, 6-chloro-2-[2-(5-methoxy-2-benzimidazolyl)-ethyl]-benzothiazole dihydrochloride and 6-ethoxy-2-[2-(5-methoxy-2-benzimidazolyl)-ethyl]-benzothiazole dihydrochloride, respectively.

EXAMPLE 14

2-[2-(5-methoxy-3-indolyl)-ethyl]-5-methoxybenzimidazole dihydrochloride 0.50 G. (2.28 m. moles) of 4-methoxy-o-phenylene diamine, and 0.477 g. (2.28 m. moles) of N,N'-dicyclohexylcarbodiimide are combined in 5 ml. of N,N-dimethyl formamide and stirred at room temperature for 24 hours. The reaction mixture is filtered and the intermediate anilide indole compound isolated by the addition of water (10 ml.) to the N,N-dimethylformamide solution. The crude anilide is dissolved in ethyl acetate and dried over sodium sulfate and filtered. The filtrate is concentrated in vacuo and the anilide purified by column chromatography over silica gel, eluting with an ethyl acetate benzene mixture (90:10). The indole anilide intermediate (0.127 g.) is cyclized into the product by combining it with 12 ml. of xylene and 1 ml. of glacial acetic acid and refluxing the mixture for 90 minutes. The reaction mixture is concentrated in vacuo to an oil. 2-[2-(5-Methoxy-3-indolyl)-ethyl]-5-methoxybenzimidazole dihydrochloride is isolated by treating the oil with chloroform, previously saturated with anhydrous hydrogen chloride. There is obtained 0.111 g. melting at 217.5° to 219.5°C.

When in the above procedure 5-methylindolyl-3-propionic acid, 5-chloroindolyl-3-propionic, 5-ethoxyindolyl-3-propionic acid or 5-methylthioindolyl-3-propionic acid is employed in place of 5-methoxyindolyl-3-propionic acid there is obtained 2-[2-(5-methyl-3-indolyl)-ethyl]-5-methoxybenzimidazole hydrochloride, 2-[2-(6-chloro-3-indolyl)-ethyl]-5-methoxybenzimidazole hydrochloride, 2-[2-(5-ethoxy-3-indolyl)-ethyl]-5-methoxybenzimidazole hydrochloride, and 2-[2-(5-methylthio-3-indolyl]-5-methoxybenzimidazol hydrochloride, respectively.

EXAMPLE 15

2-[2-(5-methoxy-1-methyl-2-benzimidazolyl)-ethyl]-4(3H)-quinazolinone 4.5 G. of methyl-3-cyanopropylcarboximidate hydrochloride is dissolved in 18 ml. of absolute ethanol and the resultant solution cooled to 5°C. Said solution is added to a pre-cooled (5°C.) solution of 4.2 g. of 4-methoxy-N-methyl-o-phenylene diamine and 16 ml. of absolute methanol over a period of 30 minutes. The reaction mixture is refluxed for 1 hour, cooled to room temperature and filtered. The solid material is washed with absolute ethanol and the combined filtrates are concentrated in vacuo. 75 Ml. of water is added to the residue and the crystalline solid material is filtered, washed with water and dried. The intermediate 5-methoxy-1-methyl-2-(β-cyanoethyl)-benzimidazole is used without further purification in the next step. Said intermediate is combined with 0.3 g. of anthranilic acid and immersed in a pre-cooled oil bath and heated to 150°C. The reaction mixture is maintained at that temperature for 15 minutes. The oil bath is removed and the solid material slurried with hot methanol, cooled, filtered and washed with methanol and hexane. The resultant 2-[2-(5-methoxy-1-methyl-2-benzimidazolyl)-ethyl]-4(3H)-quinazolinone is converted to the hydrochloride salt and purified by recrystallization from ethanol.

EXAMPLE 16

6-Methoxy-2-[2-(5-methoxy-1-methyl-2-benzimidazolyl)-ethyl]-benzoxazole dihydrochloride 4.1 G. of 2-β-cyanoethyl-5-methoxy-1-methyl benzimidazole and 1.28 ml. of ethanol are combined in 20 ml. of chloroform and the resultant solution cooled to 5°C. Anhydrous hydrogen chloride is bubbled into the reaction mixture and maintained at 5°C. until a total of 2.4 g. of hydrogen chloride has been added. The reaction mixture is stirred at 5°C. overnight. 70 Ml. of ether is added to the reaction mixture, causing immediate precipitation of the hydrochloride salt. The suspension is warmed to room temperature and filtered. The solid material is washed with ether, dried and recrystallization from ethanol affording 6-methoxy-2-[2-(5-methoxy-1-methyl-2-benzimidazolyl)-ethyl]-benzoxazole dihydrochloride.

EXAMPLE 17

2-[2-(5-methoxy-3-indole)-ethyl]-4,5-dimethoxybenzimidazole lc

5 G. of 4,5-dimethoxy-o-phenylene diamine and 4.7 g. of N,N'-dicyclohexylcarbodiimide are combined in 50 ml. of N,N-dimethylformamide and stirred overnight at room temperature. The reaction mixture is filtered and the intermediate anilide indole compound precipitated by the addition of 100 ml. of water. The solid material is filtered and dissolved in ethyl acetate and the resultant solution dried over sodium sulfate. The dried solution is concentrated in vacuo and the anilide purified -benzimidazolyl)-column chromatography, eluting with ethyl acetate/benzene (85:15) through a column of silica gel. The purified anilide is suspended in 100 ml. of xylene and 10 ml. of glacial acetic acid, and the resultant solution refluxed for 2 hours. The reaction mixture is cooled and concentrated in vacuo. The residue is treated with a solution of hydrogen chloride in chloroform and the resultant solid material recrystallized from ethanol affording 2-[2-(5-methoxy-3-indole)-ethyl]-4,5-dimethoxybenzimidazole dihydrochloride.

EXAMPLE 18

1-(2-Benzimidazolyl)-2-[2-4(3H)-quinazolinonyl]-1,2-ethanedioldihydrochloride 0.750 G. of [2R,3S]-2,3-dihydroxy-3-[2-4(3H)-quinazolinonyl]-propion-(2-amino)-anilide prepared in accordance with the process of Example 11 is suspended in 100 ml. of acetic acid and stirred under a nitrogen atmosphere for 24 hours at room temperature. The resultant clear solution is lyopholized and the residue washed with ether. The solid material is dissolved in isopropanol and treated with anhydrous hydrogen chloride until an acid reaction results. The solution is cooled and filtered. The resultant solid material is recrystallized from ethanol affording 1-(2-benzimidazolyl)-2-[2-4(3H)-quinazolinonyl]-1,2-ethanedioldihydrochloride.

The compounds prepared according to this invention are anti-viral agents, and are particularly effective in inhibiting the growth of RNA-type viruses, such as Rhinovirus, Coxsackie virus, and Parainfluenza virus. An in vitro anti-viral test screen using various Rhino virus strains used the following procedure: A tissue culture of diploid human embryonic lung cells (WI-38) obtained from commercial sources is maintained in continuous culture on nutritive medium. This tissue culture is used to evaluate the compounds for the inhibition of virus multiplication. Testing is done in quadruplicate roller tube cell cultures per dilutuion of compound. The inoculum of virus contains approximately 10 times the tissue culture infective doses ($TCID_{50}$). At day 4 or 5, control cultures of cells in the absence of any test compound are completely destroyed by virus infection.

The activity of a compound is measured by three values; two experimentally determined and one derived. The toxicity titer (given in $\gamma$ per ml.) is the greatest concentration of drug not toxic to the host cell organism in the absence of any virus. Microscopic examination of the cell indicates visible damage. If there is no visible damage, the compound is considered nontoxic. If all cells are destroyed, the compound is toxic.

The antviral titer, another experimantally determined value, is the lowest concentration of the compound that demonstrates inhibitory effect on the virus in the host organism, as determined by the absence of cytopathogenic changes in the cell. In other words, the cell is free of viral damage as determined by the presence or absence of cytopathogenesis. The cytopathogenic changes are observed in microscopically. In instances where a range of antiviral concentration of compound is given, the lowest concentration figure indicates the lowest concentration of compound at which no virus cytopathology is found.

The therapeutic index is the result obtained by dividing the antiviral titer into the toxicity titer. A value of one or greater than one indicates beneficial activity. Representative compounds of this invention which are tested indicated antiviral activity.

The following is a summary of the antiviral activity of some of the compounds of this invention when tested in the above described manner against Rhinoviruses. The column headings are as defined above and the data indicates that the compounds of this invention are indeed possessive of antiviral activity particularly against Rhinoviruses.

| Compound Name | Toxicity Titer (8/ml) | Antiviral Titer (8/ml) | | | | Therapeutic Index | | | |
|---|---|---|---|---|---|---|---|---|---|
| | | Rhino 1 | Rhino 20 | Rhino 23 | Rhino 47 | Rhino 1 | Rhino 20 | Rhino 23 | Rhino 47 |
| 5-Methoxy-2-[2-(6-methoxy-benzothiazol-2-yl)-ethyl]-benzimidazole dihydrochloride | Nontoxic at 400 | | | Active at 2 | Active at 3 | | | 200 | 133 |
| 2-[2-(5-Methoxy-2-benzimidazolyl)-ethyl]-4(3H) quinazolinone hydrochloride | Nontoxic at 400 | Active at 50 | Active at 6 | Active at 100 | Active at 6 | 8 | 67 | 4 | 67 |
| 2-[2-5-Methoxy-2-benzimidazolyl)-ethyl)-6-methoxy-benzoxazole dihydrochloride | Nontoxic at 200 | Active at 13 | Active at 25 | Active at 13 | Active at 6 | 15 | 8 | 15 | 33 |
| L-1-(5-Methoxy-2-benzimidazolyl)-2-(6-methoxy-2-benzothiazolyl)-1,2-ethanediol dihydrochloride | Nontoxic at 400 | Active at 6 | Active at 2 | Active at 2 | Active at 0.4 | 67 | 200 | 200 | 1000 |
| 2-[-2-(Benzoxazol-2-yl)-ethyl]-5-methoxybenzimidazole hydrochloride | Nontoxic at 13 | | | | Active at 13 | | | | 1 |

In view of the fact that the benzimidazoles of this invention are useful inhibitors of the described viruses, they may be used in pharmaceutical compositions suitable for oral use for injections, for topical application as ointment, or as an oral or nasal spray.

For instance, a water-soluble acid-addition salt of the benzimidazoles can be dispersed in micronized form in a propellant composition. A very small amount of a suspending agent can be present as a coating on the micronized drug particles. The propellant chosen can be any of many suitable non-toxic volatile liquid propellants known in the art. These materials are generally fluorinated or fluorochlorinated lower saturated aliphatic hydrocarbons.

Preparation of these aerosol compositions proceeds by intimately mixing, for example, two parts by weight [1S,2R]-1-(5-methoxy-2-benzimidazolyl)-2-(6-methoxy-2-benzothiazolyl)-1,2-ethanediol with three parts by weight oleyl or myristyl alcohol (up to two parts by weight mg. to one part of suspending agent can be used.) The resulting mixture can be passed through a colloid mill. This mixture is then used to formulate a self-propelling composition by admixture with a suitable non-toxic volatile propellant, about 100–500 mg. of the colloidal drug with 10–20 gm. of propellant.

The compounds of this invention can be dispersed in a solid or liquid inert pharmaceutically acceptable carrier for oral administration. The active compound is present in the composition to the extent of from 1 mg. to 1 g. depending on the nature of the virus, the severity of the infection and the stage of infection at which treatment is first initiated. The carrier may be any one or more of the inert pharmaceutically acceptable solid or liquid carriers known to those skilled in the pharmaceutical art such as lactose sucrose, calcium phosphate, water, alcohol, or a vegetable oil such as corn oil, peanut oil, and the like. The compositions may also contain other ingredients such as stabilizers, binders, antioxidants, preservatives, lubricators, suspending agents, flavoring agents, and the like.

What is claimed is:

1. A compound having the formula:

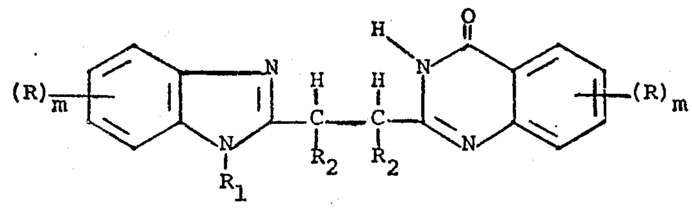

wherein each R is hydrogen or loweralkoxy, mono haloloweralkoxy, loweralkyl, with the proviso that when *m* is 2 and R is loweralkyl, R is non-tertiary lower alkyl, or when *m* is 2 the R groups together may form a methylenedioxy group; where halo defines fluorine, Chlorine and bromine; $R_1$ is hydrogen or loweralkyl; each $R_2$ is hydrogen or hydroxyl; m is 0, 1 or 2; and the non-toxic acid addition salts thereof.

2. The compound of claim 1 in which R is methoxy.

3. The compound of claim 1 which is 1-(5-methoxy-2-benzimidazolyl)-2-[2-4(3H)-quinazolinonyl]-1,2-ethanediol.

* * * * *